May 12, 1925.

A. E. BRONSON

NUT

Filed June 4, 1923

1,537,064

Inventor.
Adelbert E. Bronson
Thurston Kwit Hudson
attys

Patented May 12, 1925.

1,537,064

UNITED STATES PATENT OFFICE.

ADELBERT E. BRONSON, OF CLEVELAND, OHIO.

NUT.

Application filed June 4, 1923. Serial No. 643,218.

*To all whom it may concern:*

Be it known that I, ADELBERT E. BRONSON, a citizen of the United States, residing at Cleveland, in the county of Cuyahoga and State of Ohio, have invented a certain new and useful Improvement in a Nut, of which the following is a full, clear, and exact description.

The present invention relates to a composite nut structure which is more particularly intended for use as a rim nut in connection with a valve stem used in pneumatic tires.

The object of the invention is to produce a composite nut which may be made of similar or dissimilar metals, and one in which the parts may be readily assembled in such relation to each other that they are firmly held and secure against separation.

Figure 2:
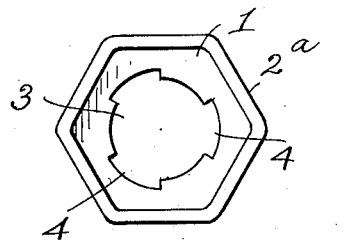
Figure 1:
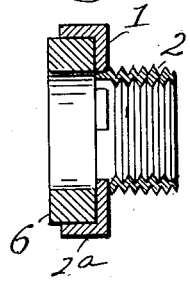
Figure 3:
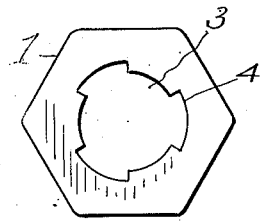
Figure 6:
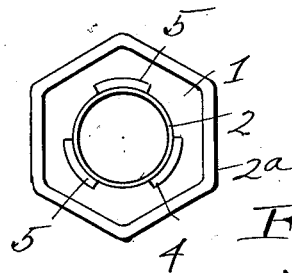
Figure 4:
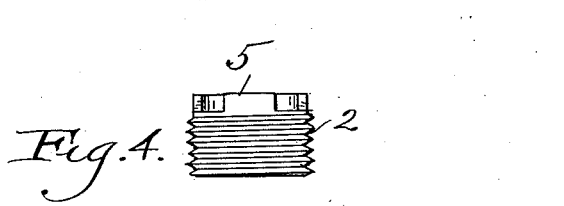
Figure 5:
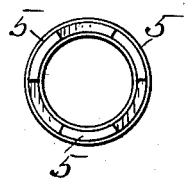

Reference should be had to the accompanying drawings forming a part of this specification, in which Fig. 1 is a sectional elevation of a nut embodying the present invention; Fig. 2 is a bottom plan view of one portion of the nut; Fig. 3 is a top plan view of a portion of the nut shown in Fig. 2; Fig. 4 is an elevation of a part of the nut which co-operates with the part shown in Fig. 2; Fig. 5 is a top plan view of the part shown in Fig. 4; Fig. 6 is a bottom plan view of the nut construction in its assembled condition.

The nut comprises two portions, a cup-shaped portion 1 and a cylindrical portion 2, which are formed separately and then assembled with respect to each other. The member 1 has a depending flange 2ª which is composed of a number of sides arranged as a polygon. The top of the cup-shaped member has a central opening 3 which is circular, and equally spaced with respect to each other are three recesses which are indicated at 4 formed in the top portion of the cup-shaped member, and opening into the major opening 3.

This portion of the nut which has just been described may readily be formed from sheet metal by the use of dies, as will be readily understood by those skilled in this art.

The other or co-operating part of the nut is shown in Figs. 1, 4 and 5, and is a hollow tubular member which is threaded upon the inside and the outside surface thereof for a considerable portion of such surfaces. The cylindrical member 2 has what may be termed a plurality of depending projections which are indicated at 5, and these are so formed and of such shape that they may be inserted through the recesses 4 which are formed in the cup-shaped member 1. The length of the projections 5 is such that they are but slightly longer than the thickness of the top portion of the cup member 1. After the member 2 has been assembled with respect to the member 1, as described, the ends of the extensions 5 are swaged outwardly, so as to tightly fit within the recess 4 and to slightly lap over the inside surface of the member 1.

This operation firmly joins the member 2 to the member 1 so that they can not be pulled apart. The engagement of the extensions 5 in the recess 4 forms a locking arrangement which enables the nut to withstand any distortion due to torsion between the parts as the nut may be tightened.

It will be seen that both of the parts which have been described may be made by commercial methods which will result in a low cost of manufacture, and that the composite nut is sufficiently strong for all the purposes for which it is used.

The purpose of making the cup-shaped member 1 in the particular shape in which it is made is for the purpose of having the cup-shaped member receive a washer 6, it being customary to use washers in connection with rim nuts. This, however, would not deter the base member from being given some other shape so long as the inter-engaging construction between the parts of the nut remain the same.

Having described my invention I claim:—

1. A nut comprising a base portion having an opening formed therein, said opening being provided with recesses at the periphery thereof, and a cylindrical tubular member having screw threads formed on a surface thereof, said tubular member being provided with extensions which are of form and size complementary to the recesses formed in the base member and said extensions being adapted to project through the opening and to occupy said recesses, said extensions having portions thereof pushed outwardly to firmly engage with portions of the base thereby to secure the two parts together as a unitary structure.

2. A nut comprising a base portion having a central opening which has a plurality of substantially equally spaced recesses at the periphery thereof, a cylindrical tubular member having the inside surface thereof provided with screw threads said tubular member having a plurality of equally spaced projections of form and size complementary to the recesses in the base member said extensions extending through the opening and occupying said recesses, portions of said extensions being distorted to engage with the base member thereby to effectively join the tubular member and the base member.

3. A nut comprising a cup-shaped member having a top portion and a side flange said top portion being provided with a central opening and having a plurality of spaced extensions which communicate with the central opening, a tubular member having screw threads upon a surface thereof, said tubular member being provided with a plurality of spaced projections which are adapted to co-operate with said recesses, the said extensions being distorted into engagement with the cup-shaped member thereby to join the cup-shaped member and the cylindrical member as a unitary structure.

In testimony whereof, I hereunto affix my signature.

ADELBERT E. BRONSON.